(12) United States Patent
Kawahara et al.

(10) Patent No.: US 6,643,038 B1
(45) Date of Patent: Nov. 4, 2003

(54) CONTACT TYPE COLOR IMAGE SENSOR

(75) Inventors: Yukito Kawahara, Chiba (JP); Satoshi Machida, Chiba (JP); Masahiro Yokomichi, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 09/482,808

(22) Filed: Jan. 13, 2000

(51) Int. Cl.⁷ .................................................. H04N 1/46
(52) U.S. Cl. ...................... 358/512; 358/514; 358/509; 358/505; 358/496; 250/208.1
(58) Field of Search ................................. 358/512, 509, 358/514, 513, 505, 506, 482, 483, 475, 487, 497, 496; 250/208.1, 234, 235, 236

(56) References Cited

U.S. PATENT DOCUMENTS 4,232,219 A * 11/1980 Yamamoto et al. ......... 358/512
6,195,183 B1 * 2/2001 Fujimoto et al. .......... 358/514

* cited by examiner

*Primary Examiner*—Cheukfan Lee
(74) *Attorney, Agent, or Firm*—Adams & Wilks

(57) ABSTRACT

A low-priced contact type color image sensor formed without the need to provide color filters on a linear image sensor. The color filters are formed on a surface of a document side of a transparent protective glass in direct contact with a document for flattening the light irradiation surface, such that the pitch thereof is equal to that of light receiving elements of a linear image sensor.

17 Claims, 6 Drawing Sheets

CONTACT TYPE COLOR IMAGE SENSOR

BACKGROUND OF THE INVENTION

The present invention relates to a contact type color image sensor suitable for an image scanner for reading image information.

As a conventional contact type color image sensor, a structure shown in a sectional view of FIG. 7 is known. Differently colored color filters 3 are formed on the surface of light receiving elements of a linear image sensor 6. A document 10 is irradiated with a lighting device such as a white fluorescent lamp 8, and the reflected light is received through the different color filters 3 by the light receiving elements to perform color separation.

SUMMARY OF THE INVENTION

However, since the surface of an IC of the linear image sensor is uneven, it is difficult to form on the light receiving elements of the IC the different color filters with the same film thickness and transmittance. Flattening techniques for moderating the surface unevenness have a strong effect in raising the cost of the product.

In order to solve the above problem, according to the present invention, color filters are formed on a surface on a document side of a transparent protective glass in direct contact with a document for flattening the light irradiation surface, such that the pitch thereof equals to that of light receiving elements of a linear image sensor. Further, in order to improve the color separation capability, the area of an opening of a unit light receiving element is made to be smaller than the area of a unit pixel of the color filters. Further, in order that light is irradiated onto a surface of a document through a part of the filters or through the space between the document and the filters, white scattering thin films are arranged and formed in proximity to the filters so as to sandwich the filters in a main scanning direction. Further, in order to eliminate abrasion of the color filters and of the white scattering thin films, the surface of the filters and the surface of the white scattering thin films are covered with a thin transparent insulating film. Further, by using a solid light source instead of a white fluorescent lamp, the shock resistance against dropping and the like is improved.

DESCRIPTION OF THE PREFERRED EMBODIMENTS

According to the present invention, color filters are formed in and are each surrounded by a planar surface on a document side of transparent protective glass in direct contact with a document for flattening the light irradiation surface, such that the pitch thereof is equal to that of light receiving elements of a linear image sensor.

Embodiments of the present invention are described in detail using the drawings.

Figure 1:
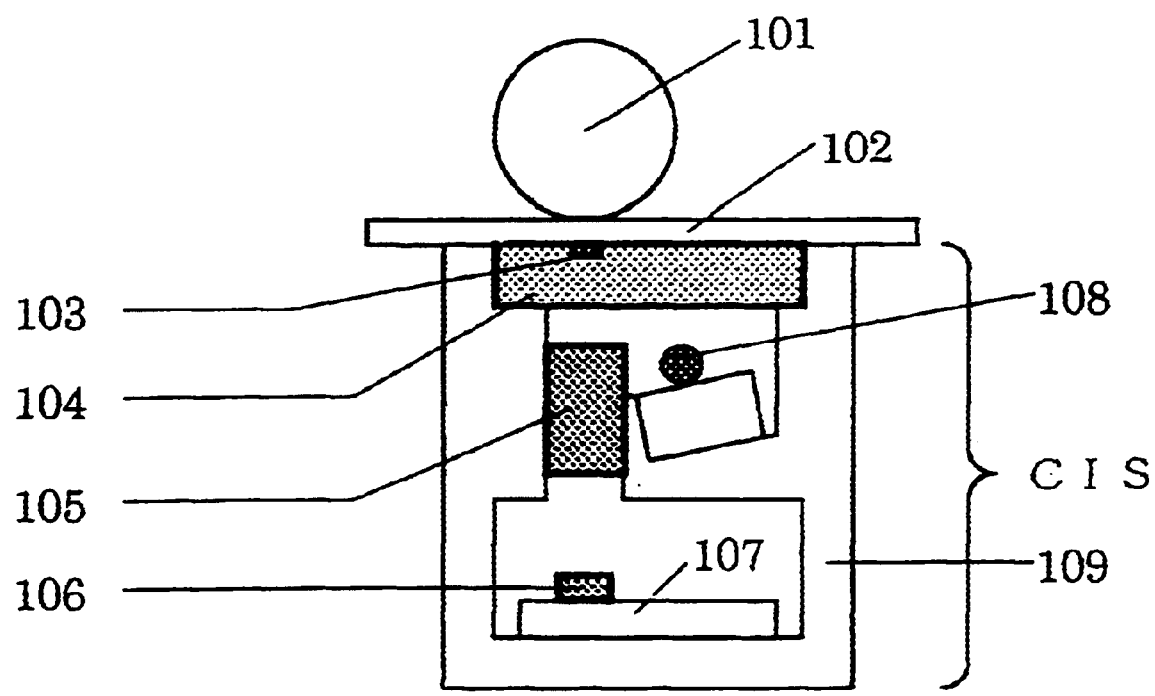
FIG. 1 is a sectional structural view of a contact type color image sensor according to a first embodiment of the present invention.

FIG. 1 is a sectional structural view of a contact type color image sensor according to a first embodiment of the present invention, also showing a document and a platen for moving the document. 101, 102, 103, 104, 105, 106, 107, 108, 109, and CIS in the figure denote the platen, the document, color filters, a transparent substrate, an equal-magnification lens, a linear image sensor, a linear image sensor support substrate, a white solid light source, a housing, and a contact type color image sensor, respectively. By light emission of the white solid light source 108, a surface of the document is irradiated directly or through the color filters 103, and light reflected by the document passes through the color filters 103 and the equal-magnification lens 105 to form on the linear image sensor an image as the image on the surface of the document. The linear image sensor 106 is low-priced since it is monochrome. The color filters have even spectral characteristics and transmittance since they are formed on a flat transparent substrate.

Figure 2:
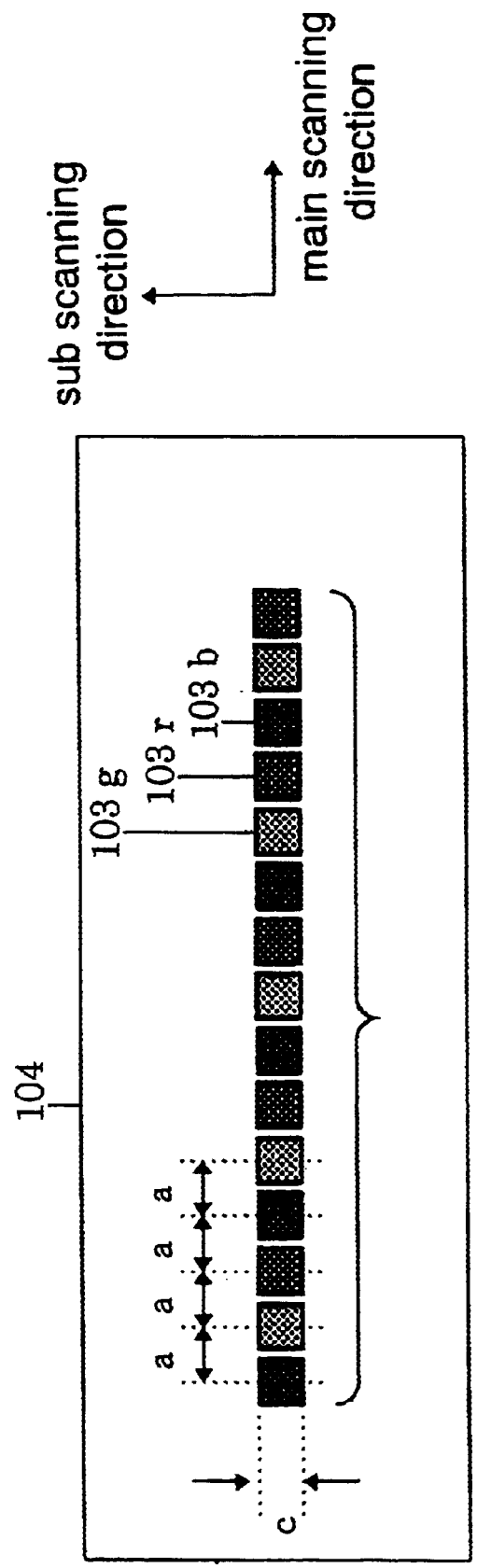
FIG. 2 is a plan view of a transparent substrate with the color filters shown in FIG. 1 arranged thereon.

FIG. 2 shows the arrangement of the color filters 103 formed on the transparent substrate 104. 103r, 103g, and 103b denote red color filters, green color filters, and blue color filters, respectively, all of which are sized to have a height of and are arranged in a main scanning direction with the equal pitch a.

Figure 3:
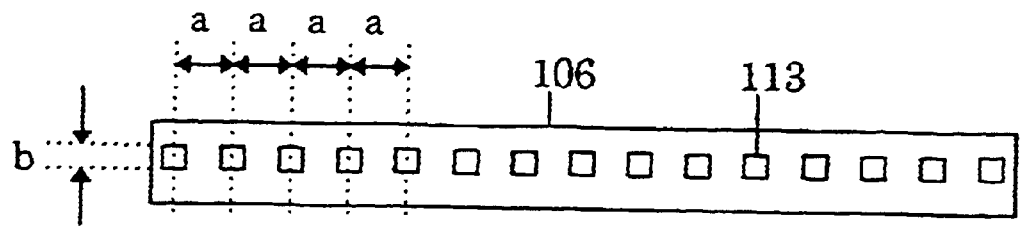
FIG. 3 is a plan view showing the arrangement of openings of light receiving elements in the linear image sensor shown in FIG. 1.

FIG. 3 shows the arrangement of openings 113 of light receiving elements in a plan view of the linear image sensor 106. They are arranged in the main scanning direction with the same pitch a, as that of the color filters shown in FIG. 2. By making the size b of the openings 113 smaller than the size c of the color filters, deterioration of the color separation capability due to the resolution characteristics of the equal-magnification lens 105 and deterioration of the color separation capability due to misregistration between the color filters 103 and the linear image sensor 106 can be suppressed.

Figure 4:
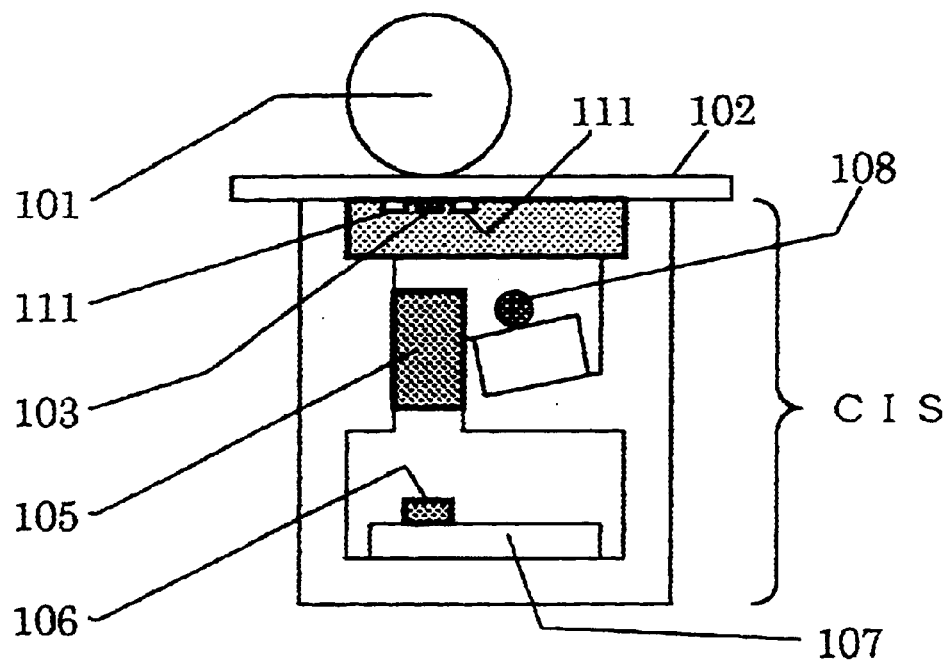
FIG. 4 is a sectional structural view of a contact type color image sensor according to a second embodiment of the present invention.
Figure 5:
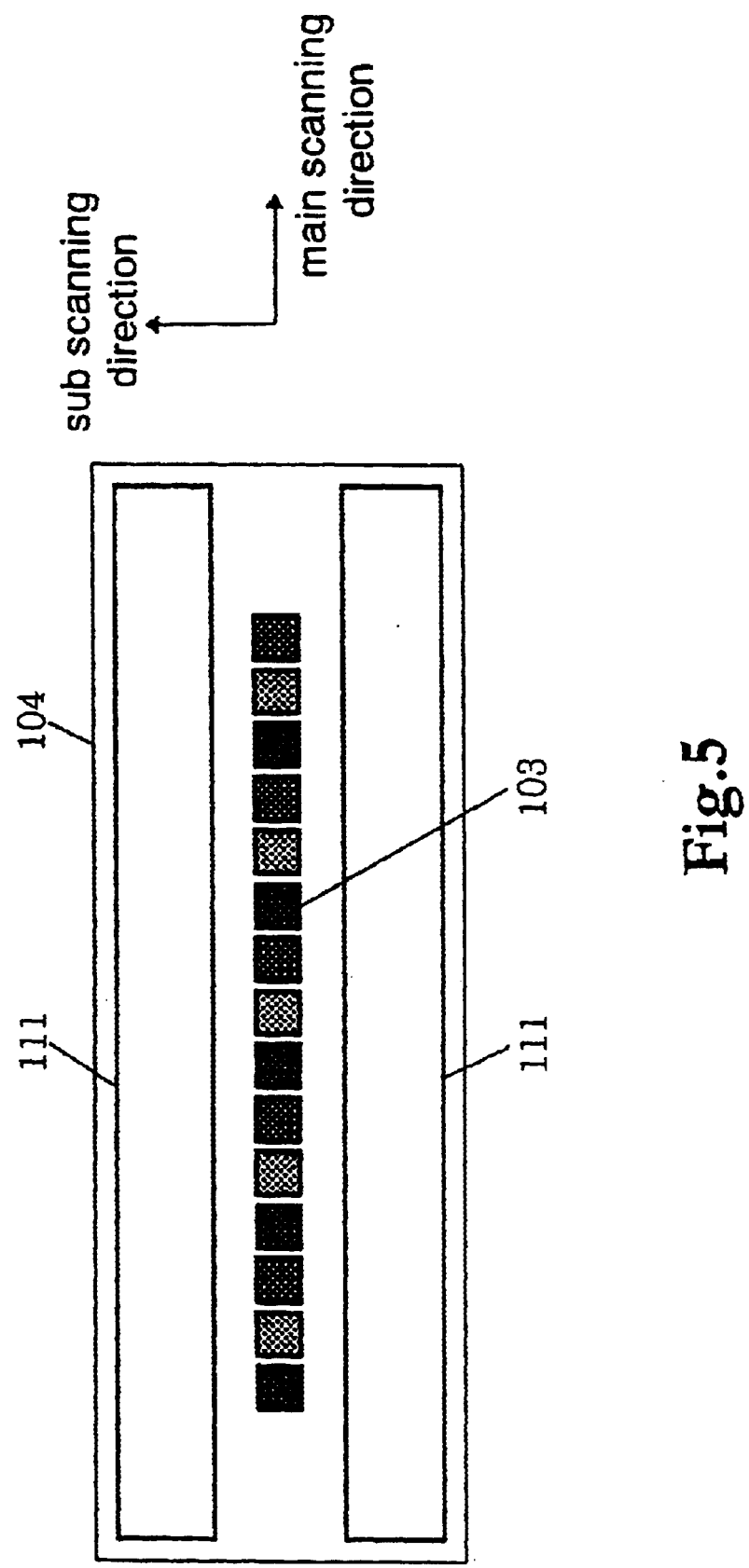
FIG. 5 is a plan view of a transparent substrate with the color filters and the scattering thin films shown in FIG. 4 arranged thereon.

FIG. 4 is a sectional structural view of a contact type color image sensor according to a second embodiment, of the present invention. 111 denotes white scattering thin films. Light from the solid light source 108 is reflected by an end portion of the white scattering thin films 111 to irradiate a desired surface of the document 102. FIG. 5 shows the arrangement of the white scattering thin films 111 on the transparent substrate 104 in that case. They are formed in two lines in the subscanning direction so as to sandwich the color filters 103 in a main scanning direction.

Figure 6:
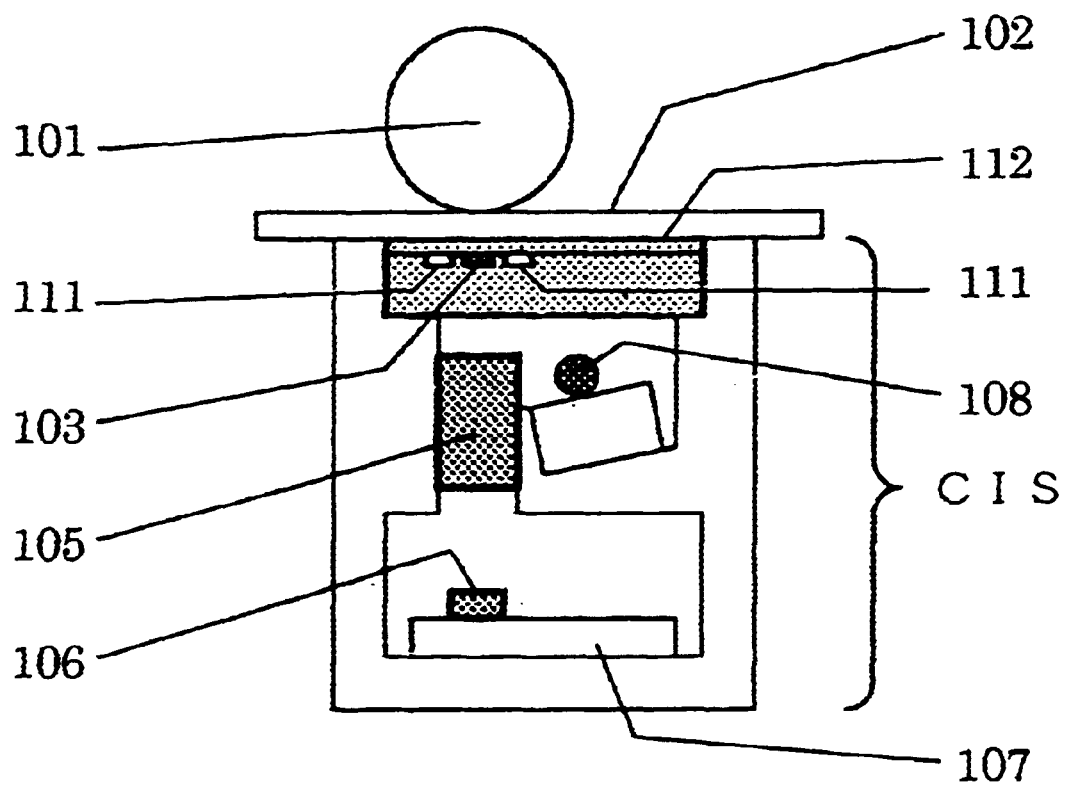
FIG. 6 is a sectional structural view of a contact type color image sensor according to a third embodiment of the present invention.
Figure 7:
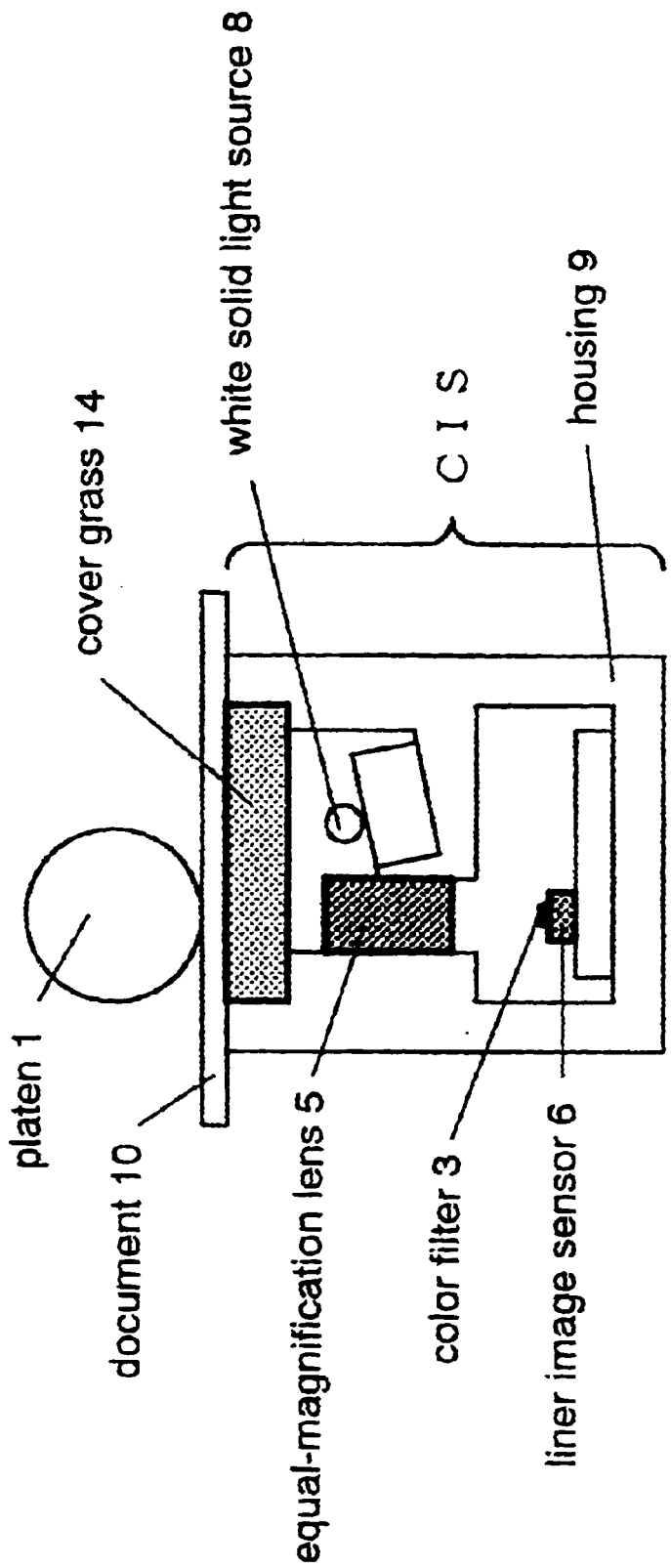
FIG. 7 is a sectional structural view of a conventional contact type color image sensor.

FIG. 6 is a sectional structural view of a contact type color image sensor according to a third embodiment of the present invention, in which a transparent thin film 112 for protecting the color filters 103 and the white scattering thin films 111 is formed on a surface of the transparent substrate 104 where the color filters 103 and the white scattering thin films 111 are formed. Though the transparent thin film 112 covers all over the surface of the transparent substrate 104 in FIG. 6, the transparent thin film 112 may cover only the color filters 103 and the white scattering thin films 111. The white scattering thin films 111, the transparent protective film 112, and the color filters 103 are not limited to thin films, and may be of a thin plate or may be a treated surface of the transparent protective substrate 104.

As described above, by using the present invention, color filters could be formed with ease, a low-priced monochrome image sensor could be used, and a low-priced contact type color image sensor with even spectral characteristics could be materialized.

Further, by using the present invention, resolution of the equal-magnification lens and misregistration in mounting could be absorbed to improve the color separation capability.

Further, by using the present invention, documents of different paper quality and blackish documents could be clearly read under the influence of light reflected by the white scattering thin films.

Further, by using the present invention, abrasion of the color filters and of the white scattering thin films due to movement of documents could be eliminated to eliminate deterioration of the quality of read images.

Further, by using the present invention, the thickness of the transparent protective film further enhanced the effect of the white scattering thin films to suppress the current consumption of the light source.

Further, by using the present invention, the white solid light source is not broken in the event that the sensor is dropped, and the shock resistance against dropping and the like was improved.

What is claimed is:

1. A contact type color image sensor comprising: a transparent substrate with two opposing parallel surfaces, a first one of which is brought into direct contact with a document to be sensed; a plurality of different color filters disposed in the transparent substrate such that upper exposed surfaces thereof are flush with the first surface of the transparent substrate to form a planar surface that is brought into direct contact with the document to be sensed; and a linear image sensor for sensing the document.

2. A contact type color image sensor as claimed in claim 1; wherein the plurality of different color filters comprise color filters of three different colors disposed dispersedly and periodically in a main scanning direction of the color image sensor, and in a substantially linear manner, the pitch of the dispersion of the color filters being equal to the pitch of light receiving elements of the linear image sensor.

3. A contact type color image sensor as claimed in claim 1; wherein the size of openings for absorbing light of a plurality of light receiving elements of the linear image sensor is shorter than the pitch of the dispersion of the color filters.

4. A contact type color image sensor as claimed in claim 1; further comprising white scattering thin films formed on the surface of the transparent substrate in the subscanning direction and arranged so as to sandwich the color filters in a main scanning direction of the color image sensor.

5. A contact type color image sensor as claimed in claim 1; further comprising a transparent protective film for protecting the color filters formed between the color filters and the document.

6. A contact type color image sensor as claimed in claim 1; further comprising a light source for irradiating the document comprising a white solid light source.

7. A color image sensor comprising: a housing; a transparent support member disposed in the housing for supporting a sheet containing an image to be detected and having two opposing parallel surfaces, a first one of which is brought into direct contact with the sheet having the image to be detected; a linear image sensor disposed in the housing for detecting the image; a plurality of color filters of different colors provided in the transparent support member such that upper exposed surfaces thereof are flush with the first surface of the transparent support member to form a planar surface that is brought into direct contact with the sheet; and a lighting device for projecting light onto the image such that light reflected by the image is projected through the color filters and received by the light receiving elements to perform color separation.

8. A color image sensor according to claim 7; wherein the linear image sensor is a monochromatic image sensor.

9. A color image sensor according to claim 7; wherein the transparent support comprises a protective glass sheet.

10. A color image sensor according to claim 9; wherein the color filters are formed on a surface of the protective glass sheet on a document side thereof in direct contact with the image to be detected so as to flatten the light irradiation surface.

11. A color image sensor according to claim 7; wherein a pitch between the color filters is equal to that of light receiving elements of the linear image sensor.

12. A color image sensor according to claim 7; wherein the area of an opening of each of the light receiving elements is smaller than the area of a unit pixel of the color filters.

13. A color image sensor according to claim 7; further comprising white scattering thin films arranged proximate to the color filters so as to sandwich the filters in a main scanning direction of the color image sensor.

14. A color image sensor according to claim 7; further comprising a thin transparent film covering the surface of the filters and the surface of the white scattering thin films to prevent abrasion of the color filters and the white scattering thin films.

15. A color image sensor according to claim 7; wherein the lighting device comprises a solid light source.

16. A color image sensor according to claim 7; further comprising platen opposing the transparent support for moving the document.

17. A color image sensor according to claim 7; further comprising a lens disposed between the color filters and the linear image sensor.

\* \* \* \* \*